United States Patent [19]

Comstock

[11] Patent Number: 4,495,787
[45] Date of Patent: Jan. 29, 1985

[54] LOCKING MEANS FOR BATTERY, ETC.

[76] Inventor: Harold N. Comstock, 1113 E. 64th St., Cleveland, Ohio 44103

[21] Appl. No.: 460,610

[22] Filed: Jan. 24, 1983

[51] Int. Cl.³ .............................................. E05B 65/12
[52] U.S. Cl. .................................... 70/258; 292/181; 248/553
[58] Field of Search ...................... 70/258, 57, 58, 61, 70/62; 292/39, 40, 177–182, 259, 260; 180/68.5; 248/551–553, 503, 505

[56] References Cited

U.S. PATENT DOCUMENTS

| | | | |
|---|---|---|---|
| 1,650,836 | 11/1927 | Jacobson | 292/40 |
| 2,352,111 | 6/1944 | Meyer | 180/68.5 |
| 2,709,494 | 5/1955 | Luce | 180/68.5 |
| 3,105,567 | 10/1963 | Schultz, Jr. | 180/68.5 |
| 3,752,254 | 8/1973 | Carley et al. | 180/68.5 |
| 4,066,307 | 1/1978 | Barding | 248/553 X |
| 4,191,034 | 3/1980 | Froess et al. | 70/258 |

Primary Examiner—Gary L. Smith
Assistant Examiner—Thomas J. Dubnicka
Attorney, Agent, or Firm—J. Helen Slough

[57] ABSTRACT

A lock for securing an automobile storage battery of other automatic accessory from being stolen when the vehicle is left unattended, the lock consisting of a pair of L-shaped brackets securely mounted on an existing battery tray replacing the battery hold-down, the brackets being formed of a carbonized steel and provided with horizontally extending slots in the upper ends of each vertical upstanding member through which opposite ends of a double ended sliding double bolt operated by means of a key cylinder lock project when the key is turned by the operator.

The key cylinder is imbedded in a steel cover for the rectangular container containing the bolts and the locking bar is centrally and pivotally mounted on the lower end of the cylinder by means of a shear pin which, when the key is removed from the lock, will shear upon any attempt to drill the cylinder and hence be unable to function for disengaging the bolts from their engagement with the brackets enclosing the battery.

7 Claims, 10 Drawing Figures

LOCKING MEANS FOR BATTERY, ETC.

This invention relates generally to a lock for automatic accessories and relates more particularly to a tamper resistant lock for vehicle storage batteries.

In the prior art, battery locks have been proposed which in effect either provide padlocking of the battery as described in U.S. Pat. No. 4,191,034; citizen band radios have been locked by key locks to frame bar members carried by the dashboard as shown in U.S. Pat. No. 4,028,913; and key locks have been provided for acceleration pedals as described in U.S. Pat. No. 2,931,207. In the latter patent a sliding bolt is adapted to move into engagement with openings in the housing secured to the floor board of the vehicle. In U.S. Pat. No. 3,410,122 an anti-theft lock for vehicular radios and tape players is constructed of a lock having two flat plate elements A and B, each element adjoining one wall of the radio etc. with nuts and bolts attaching the bracket mount thereto. The upper U-shaped plate member is provided with downwardly extending legs adapted to be projected through slots in a flange carried at the upper end of the lower plate element. A detector bicycle lock overlies the unit securing means carrying an elongate notched bar and interlocks therewith.

The primary aim of this invention is to provide tamper resistant lock means for a battery to prevent its removal by theft from its vehicle location. The lock means are provided by a key operated lock box bridging the top of the battery supported on pedestal means disposed adjacent opposite sides of the battery secured to a battery tray or base on which the battery rests.

It is an object of the invention to provide a battery lock of the type referred to which will be simple in construction, inexpensive in manufacture and highly efficient in use.

Another object of the invention is to provide means to disable the lock should illegal entry be sought.

A still further object of the invention is to provide an ease of removal of the battery enclosed locking means when replacement or repair of the same is desired.

Other objects and advantages of the invention will become readily apparent from the following description taken in connection with the accompanying drawings, in all of which:

Figure 1:
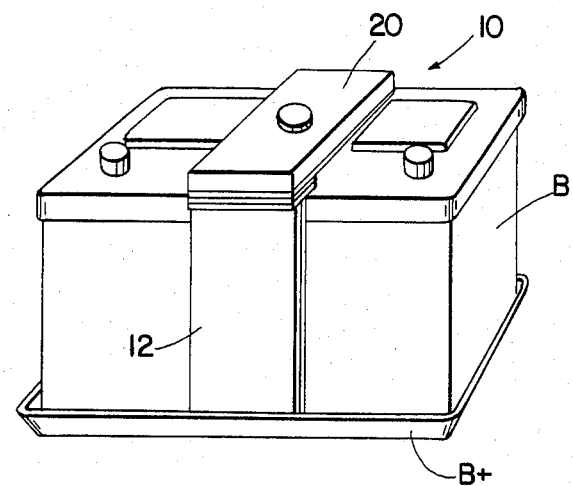
FIG. 1 is a persepective view of the locking device or lock box invention as applied to a battery and shown mounted in locked position thereon.
Figure 2:
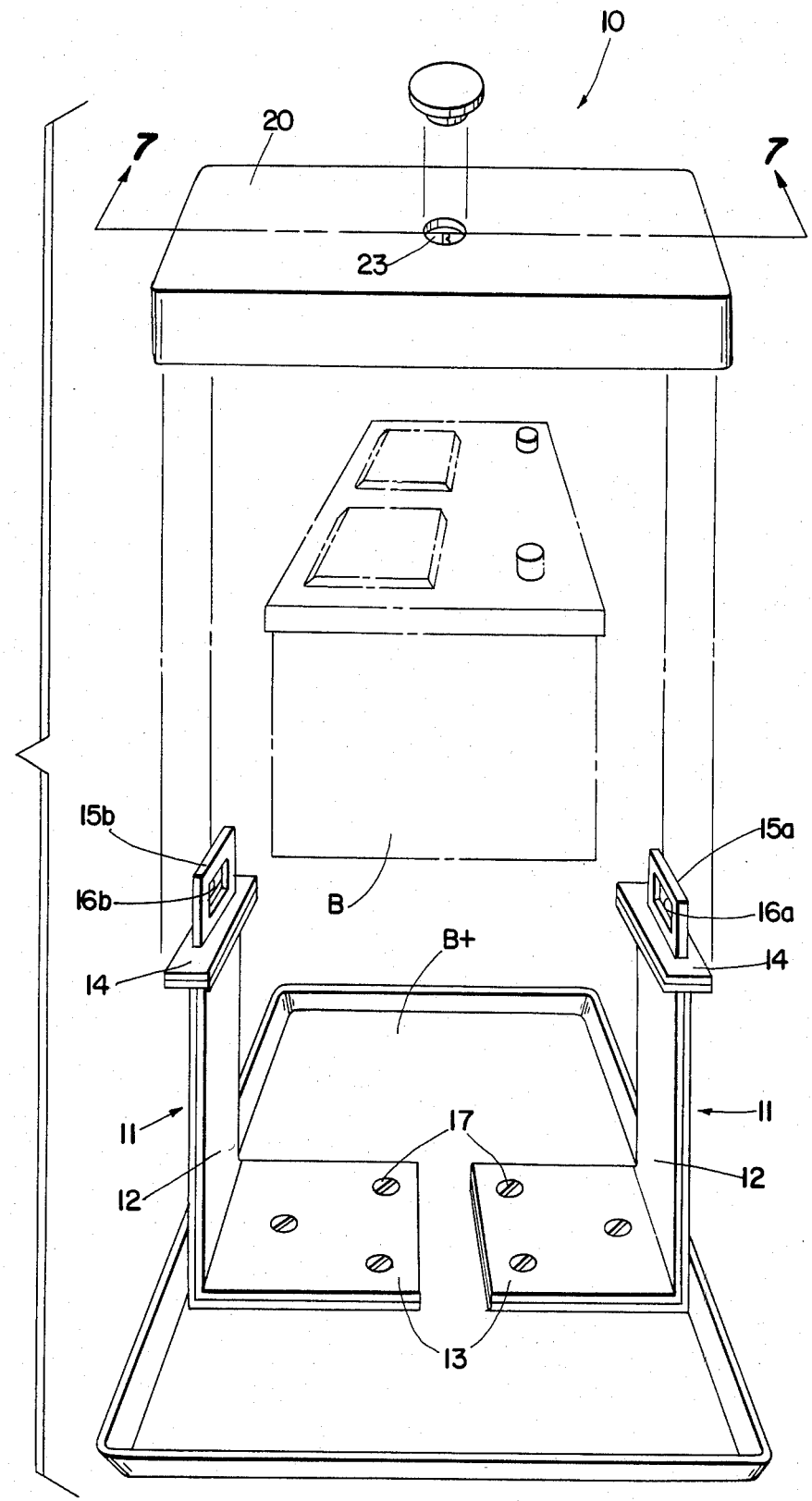
FIG. 2 is an exploded view of the locking device of FIG. 1 disclosing the battery in association therewith.

Referring now to the drawings in all of which like parts are designated by like reference characters, and referring particularly to FIGS. 1 and 2, the numeral 10 designates generally the locking means of my invention applied to a battery designated at B and seated upon a tray or base B+. The locking means for the battery comprises a lock box 20 mounted on pedestal means 11 secured to the tray or base B+ as by fastening means 17 such as screws or the like. The pedestal means 11 consist of a pair of preferably L-shaped brackets each comprising a flat horizontal member 13 and an upwardly extending flat vertical member 12 each vertical member having a reduced upper end portion or ear 15a and 15b respectively thus providing a platform or sub-base member 14 which is adapted to underlie the bottom 21 of the lock box, when the upper ends of the brackets 15a and 15b are projected into the lock box as hereinafter later described. The reduced upper end portions or ears 15a and 15b of the brackets are provided with rectangular openings or slots 16a and 16b respectively which slide bolts 26, 27 mounted in the lock box 20 are adapted to enter to lock the lock box on either side of the battery to the vertical members of the brackets thus surrounding and locking the battery on the sides, top and bottom thereof.

It will be noted that the L-shaped brackets mounted on the battery tray replace conventional battery hold-down devices.

Figure 7:
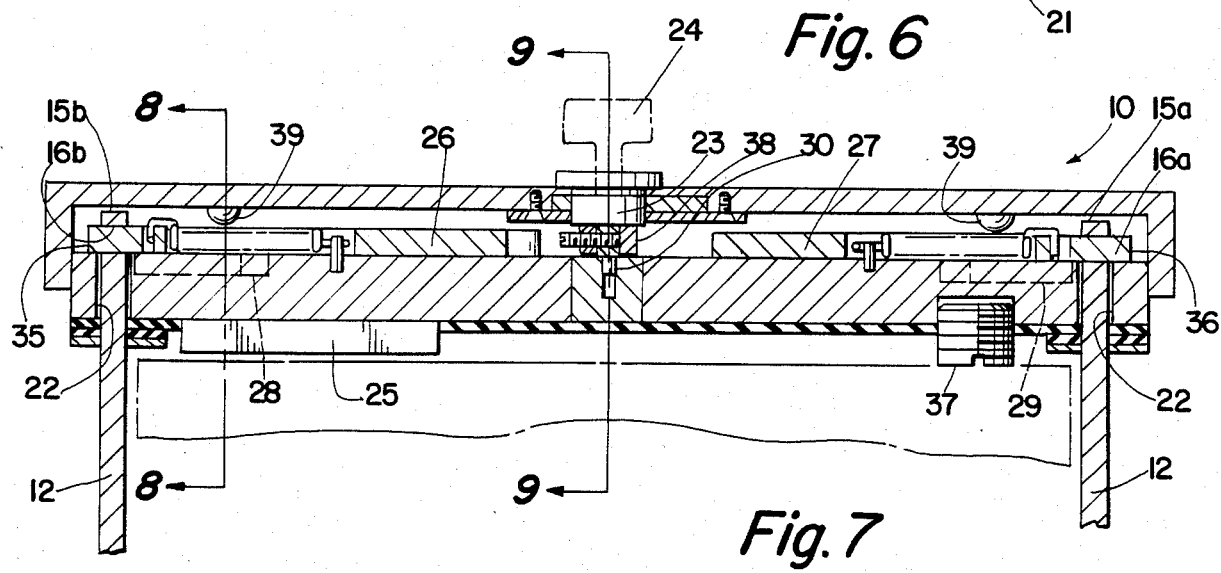
FIG. 7 is a cross sectional view taken on the line 7—7 of FIG. 4.
Figure 8:
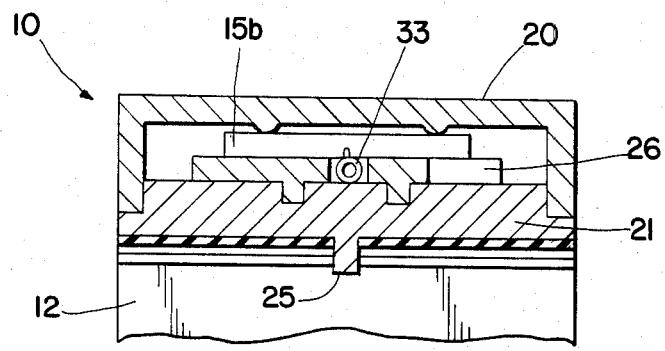
FIG. 8 is a cross sectional view taken on the line 8—8 of FIG. 7.

Shoulders 14 are provided by the reduction in the upper ends of the vertical legs 12 of the brackets 11 on which rubber pads or the like may, if desired, be placed and that said shoulders extend on either side of the elongated openings 22 provided in the bottom of the lock box 20 through which the said legs project and abut surfaces surrounding such openings as best shown in FIG. 7. The bottom 21 of the lock box also has a rectangular bar 25 depending therefrom which is adapted to prevent sliding of the battery thereunder. Adjustment means 37 secured to the battery and adapted to be threaded into and away from the bottom 21 of the lock box as shown and are provided for adjusting the level of the lock box with relation to the battery and also assist in preventing movement of the battery.

Figure 3:
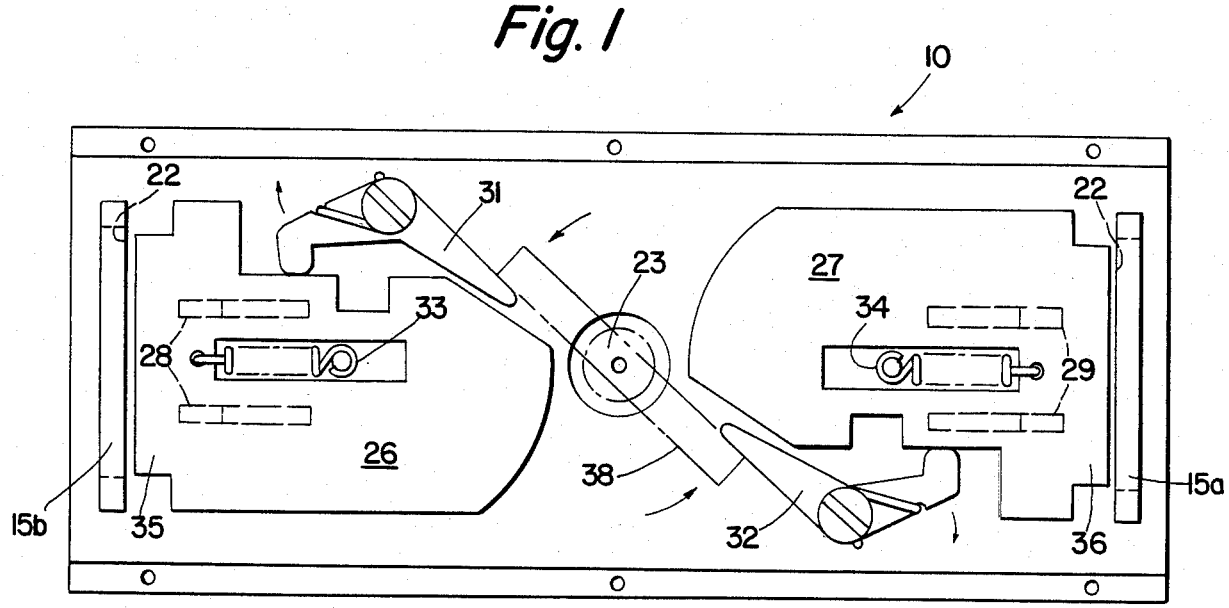
FIG. 3 is a top plan view of the bottom of the lock box of FIG. 1 showing the same in its unlocked position.
Figure 4:
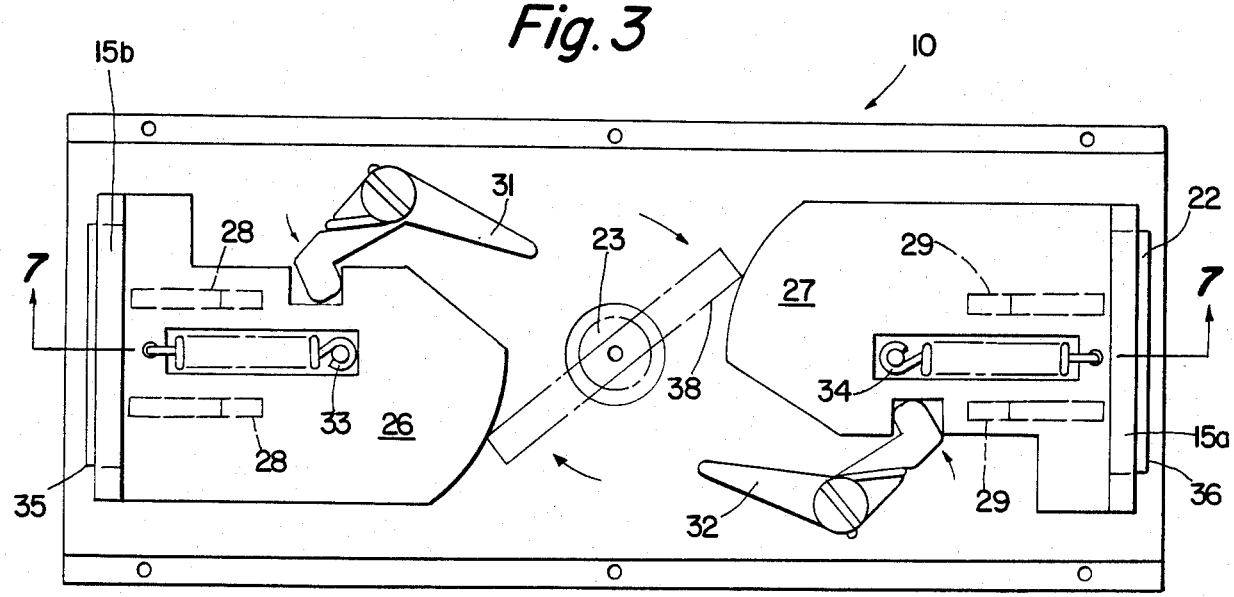
FIG. 4 is a top plan view similar to that of FIG. 3 showing the parts in their locked position.
Figure 9:
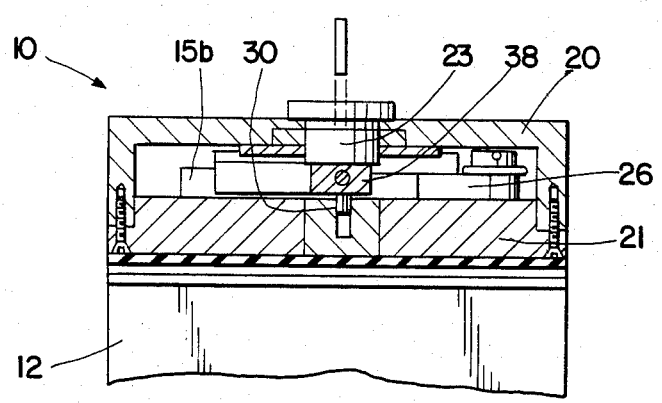
FIG. 9 is a sectional view taken on the line 9—9 of FIG. 7.

The lock box 20 which is adapted to be mounted upon and interlocked with the brackets 11 is provided with a solid preferably hardened steel cover into which a key cylinder 23 as best shown in FIGS. 7 and 9 is embedded preventing forced removal thereof. The key cylinder 23 is provided with a rotatable locking bar or cam 38 disposed beneath the cover which is adapted upon rotation by the key 24 to cam flat slide bolts 26, 27 disposed within the bottom 21 of the lock box and to slide the reduced ends 35,36 of the same into and through the slots 16a and 16b in the vertical legs 12, as best shown in FIGS. 3 and 4. Latching or locking dogs 31, 32 are adapted to be contacted by the bar 38 as well and operate to release the slide bars for movement. An end of said dogs 31, 32 upon camming of the bolts into locking engagement with the vertical legs of the brackets or pedestals drops into a U-shaped recess or notch 41, 42 in an edge of the slide bolt as best shown in FIG. 4 to to cause the slide bolts 26, 27 to move outwardly whereby the ends 35, 36 are projected through the openings 16a and 16b in the upper ends 15a and 15b of the vertical member 12 to lock the bolt in its interlocked relation with the legs of the pedestal or brackets 12. Spring tension means 33, 34 are secured to the bolts 26, 27 respectively and to the bottom 21 of the lock box 20 to assist in the holding of said bolts 26, 27 in their unlocked position. Reverse movement of the lock bar will release the dogs from their locked position with the slide bars 26, 27 and, as shown in FIG. 3, the slide bars then are able to move inwardly under the action of the spring 33 to unlock the battery.

As shown in FIG. 7 the bolts 26, 27 are preferably provided with a pair of ribs or slideguides 28, 29 adapted to ride in spaced grooves 40 in the base of the lock box during sliding movement of the bolts.

Figure 5:
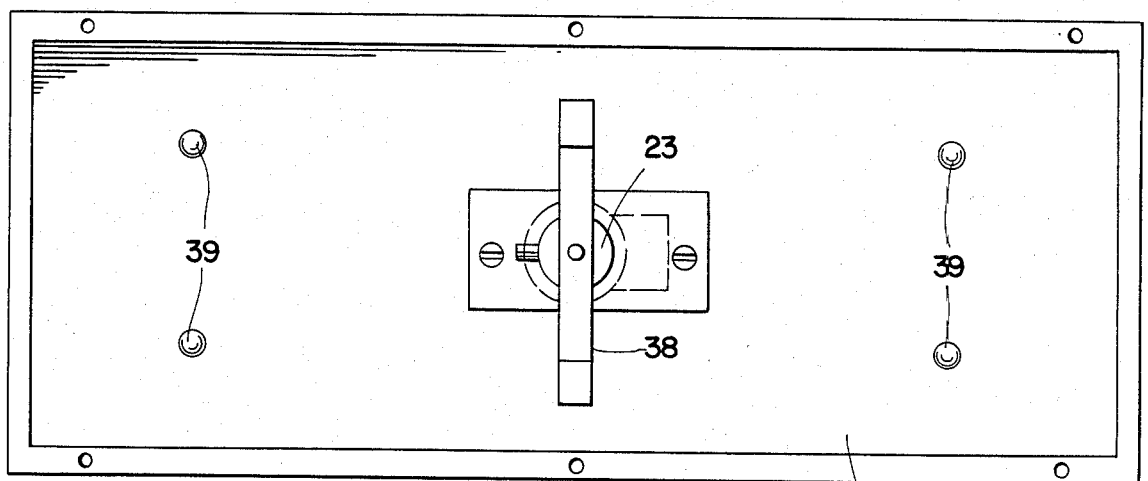
FIG. 5 is a bottom plan view of the cover of the lock box of FIG. 1.
Figure 6:
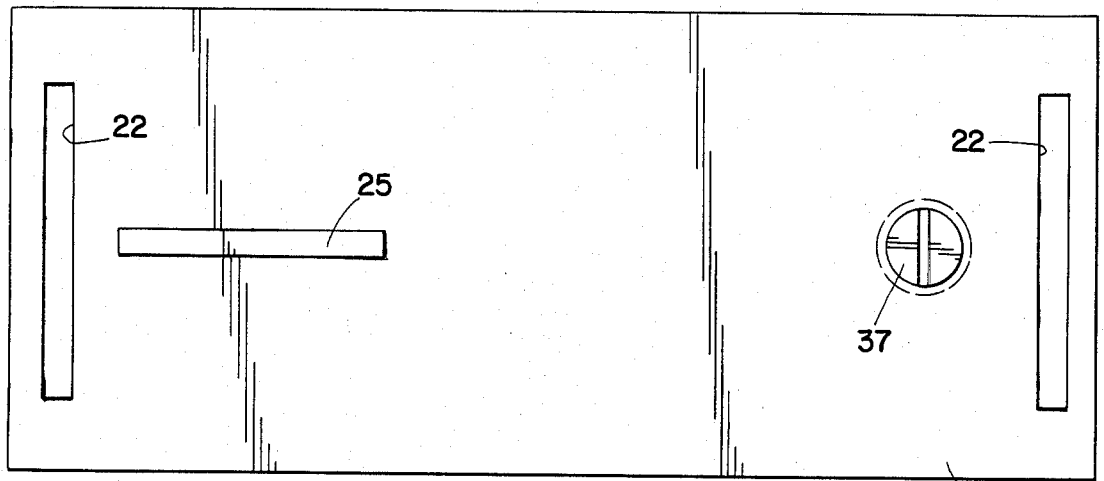
FIG. 6 is a bottom plan view of the bottom of the lock box of FIG. 1.

As best shown in FIG. 5 the top or cover of the lock box may be provided with depending bosses 39.

Figure 10:
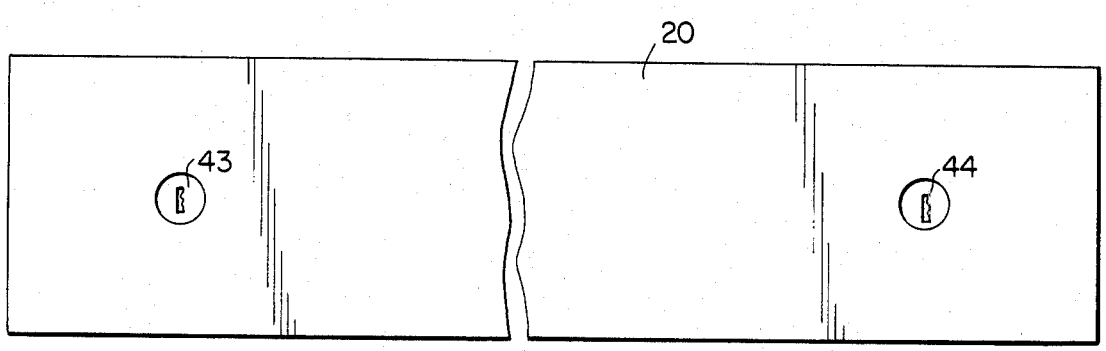
FIG. 10 is a plan view of a modification of the invention illustrating two separate cylinders adapted to lock both ends of the enclosure, both being coded to the same key.

It is to be noted that the key according to the invention is preferably made of tool steel and the cover of core hardened steel carbonized to a degree whereby a hacksaw will not be able to cut the same. The dogs, the cover and the brackets are preferably all made of hard steel as are the dogs and a steel spring is preferably used. The lock is similar to a Yale cylinder lock and is movable by a key. It is provided with a shear pin 30 on which the locking bar 38 is carried, which pin in the event a tool other than a key made specifically for use with the cylinder lock is forced into the key opening to rotate the cylinder, will be sheared off and hence the locking bar will become inoperative. As shown a single key operates the double ended double lokcs. In FIG. 10 a suggested variant of the invention positioning a pair of locks 43, 44, one at either end of the cover is shown, which are adapted to be operated by a key similar to the key 24.

In assembling the lock the horizontal feet of the brackets are first secured to the battery tray as shown and the sides disposed in close proximity to either side of the battery as shown in FIG. 1.

Although I have described the invention in connection with a preferred embodiment, it is to be understood that numerous and extensive departures may be made therein such as application to tool boxes and the like without however departing from the spirit of my invention and the scope of the appended claims.

What I claim is:

1. A tamper resistant lock for attachment to a battery comprising in combination a frame structure including a pair of pedestals secured to spaced opposite ends of a battery tray on which the battery rests, a lock box having a solid cover portion and a recessed bolt containing bottom portion adapted to be mounted on said pedestals, said bottom portion being provided with spaced openings on opposite sides of the bottom thereof through which vertical upwardly extending portions of the pedestals project, each of said vertical legs being provided with an elongated slot adjacent its upper projecting end, a pair of flat bolts slidably secured in the recessed portion of the bottom portion on opposite sides thereof, a key actuated lock recessed in the cover having a locking bar adapted to be rotated by the key lock to slide each of said bolts in the recessed portion of the cover through said each of said elongated slots to form a battery enclosing lock.

2. The lock of claim 1 wherein means are provided to latch the bolts in a locked position.

3. The lock of claim 1 wherein the locking bar cams the slidable bolts into pedestal locking engagement.

4. The lock of claim 1 wherein a shear pin is provided on a lock cylinder embedded in said solid cover which will shear when the said cylinder is penetrated by means other than the key.

5. A lock as claimed in claim 1 wherein guide means are provided in the bottom of the cover for guiding the movement of the slide bolts.

6. A lock as claimed in claim 1 wherein the bolts are provided with spring tension means.

7. A lock as claimed in claim 1 wherein the lock box is provided with means for adjusting the lock level relative to the top of the battery.

* * * * *